United States Patent Office 3,412,816
Patented Nov. 26, 1968

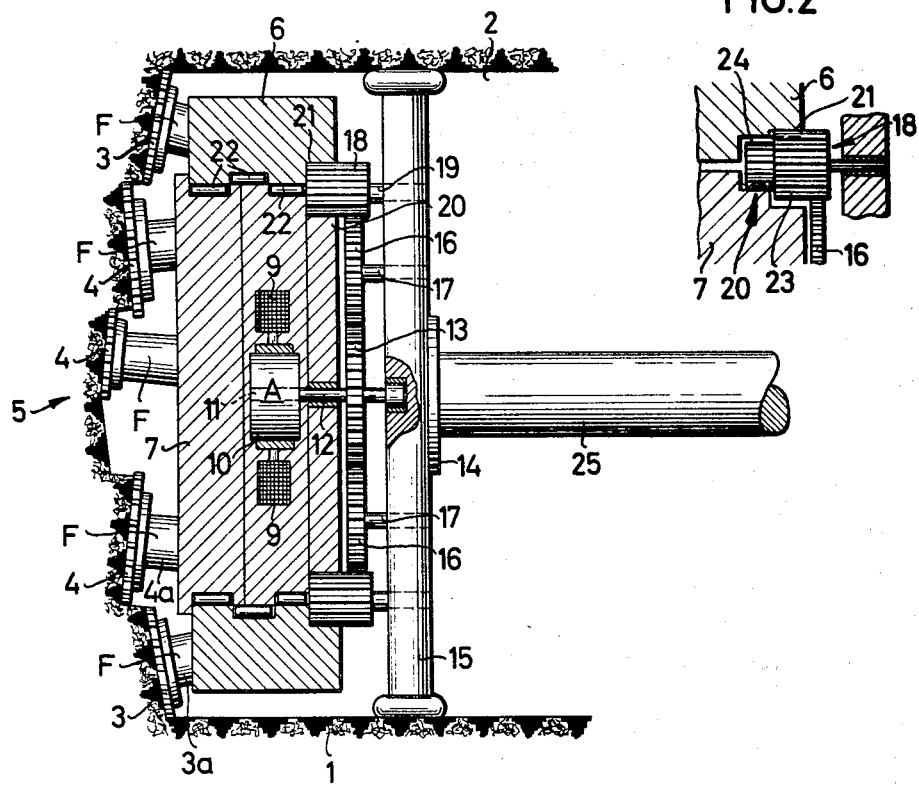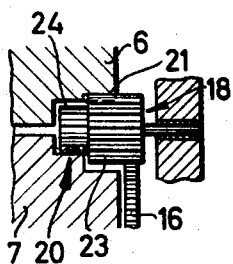

3,412,816
TUNNEL BORING HEAD HAVING RELATIVELY ROTATING CONCENTRIC SECTIONS
Hermann Lautsch, 190 Feldhauserstrasse, 435 Gladbeck, Germany
Filed July 1, 1966, Ser. No. 562,331
Claims priority, application Germany, July 26, 1965, L 51,221
4 Claims. (Cl. 175—106)

ABSTRACT OF THE DISCLOSURE

A boring machine for boring underground tunnels having two carrier bodes, each of which is adapted to carry on its forward face a plurality of cutting tools. The carrier bodies are concentrically mounted, one within the other for mutually independent rotation about a common axis. For rotating the carrier bodies, there is a drive motor having a rotor and a stator. The rotor is rigidly connected to the first carrier body for rotation with it in one direction of rotation, and the stator is mounted for rotation about the common axis. The stator has a coaxial shaft which has bearing in a support member, and on this shaft fixed for rotation is a sun wheel. On the respective carrier bodies and facing each other are external and internal gear teeth, with which a pinion fixed for rotation to the support member, meshes. A planetary drive including the sun wheel and at least one planet wheel fixed for rotation to the support member, meshes with said pinion thereby to drive from the stator the second carrier body in a direction of rotation opposite to that of the first carrier body. The support member has a shaft disposed along the common axis of rotation of the carrier bodies, and which is mounted on a body portion of the machine.

---

This invention relates to a method and means for driving rotatably operating boring machines, for boring horizontal, inclined or vertical underground tunnels, provided with two concentrically rotatable carrier bodies each carrying several cutting tools the carrier bodies being driven in opposite directions of rotation.

In previously known boring machines of this kind the two concentrically rotatably carrier bodies are driven by separate motors, the stators of the motors being mounted on a travelling carriage or the like, of the machine and thereby prevented from rotating. The rotors of the motors then drive the carrier bodies and are the parts of the drive motors which actually rotate.

As is well known, the torque exerted by the rotor of a motor is accompanied by an equal end opposite reaction torque exerted by the respective stator thereof. This law of nature results in the fact that the stator exerts relatively large forces on the travelling carriage or the like on which it is mounted, and the carriage has to transmit these forces to the rock or, in the case of two oppositely rotating motors, to sustain the mutually opposite reaction torques in the vicinity of the stators and transmit their resultant to the rock. In any case not only is an inordinately heavy and therefore cumbersome machine construction required, but the sustaining of the forces and their transmission to the rock also leads to undesired movements of the machine as a whole which have to be opposed by the application of corresponding control forces. The high speeds of advance of modern advancing machines which are based on the boring principle demands however the accurate following of a predetermined course which is in itself difficult to attain merely because of the heterogeneity of the body of the rock, since the rock cannot be considered as a homogenous medium, and this problem of control becomes so inordinately complicated because of the constantly changing reaction torques that the accurate following of a predetermined course by the machine requires measures which result in a marked reduction in the practically attainable speed of advance.

It is an object of the present invention so to arrange the drive of rotatably operating boring machines of the kind referred to that the reaction torque which the machine has to sustain is effectively minimized.

According to the invention there is provided a method of driving a rotationally operating boring machine for boring underground tunnels, such machine comprising a drive motor, having a stator and a rotor, and two concentrically and independently rotatable carrier bodies each adapted to carry a plurality of cutting tools, comprising coupling a first of the carrier bodies to the drive motor rotor to be rotated thereby in one direction of rotation, mounting the motor stator rotatably and coupling the other of the carrier bodies to the rotatable stator to be rotated thereby in the opposite direction of rotation, energizing the drive motor and thereby producing relative rotation between its rotor and its stator, and coupling the carrier bodies to one another by means of at least one pinion meshing with both carrier bodies and freely rotatable about a fixed axis, thereby providing a fixed relationship between the rotational speeds of the two carrier bodies and thus of the rotor and stator of the drive motor.

By this method in accordance with the invention, the rotor rotates one of the carrier bodies in one sense of rotation whilst the stator drives the other carrier body in the opposite sense of rotation with a torque corresponding to the torque exerted by the rotor. The speeds of rotation of the stator and of the rotor are, however, not independent of each other, since the pinion meshing with both carrier bodies determines the ratio of their speeds of rotation and thus also the ratio of the speeds of rotation of the stator and rotor of the motor. Consequently a machine provided with this kind of drive is dynamically equalized and supported because within the practically possible limits the torques of the stator and the rotor mutually cancel each other out. This is also the case when the rock is heterogeneous.

According to the invention there is further provided a rotationally operating boring machine comprising first and second carrier bodies, each adapted to carry a plurality of cutting tools, concentrically mounted for mutually independent rotation relative about a common axis of rotation, a drive motor comprising a rotor and a stator, the rotor being rigidly connected to the first carrier body for rotation therewith in one direction of rotation and the stator being mounted for rotation about the said common axis, at least one pinion mounted for rotation about a first fixed axis, external and internal gear teeth being provided on the respective carrier bodies and meshing with the said pinion, and a planetary drive comprising a sun wheel rigidly connected with the stator for rotation therewith and at least one planet wheel rotatable about a second fixed axis and in mesh with the sun wheel and with the said pinion, thereby to drive the second carrier body in the other direction of rotation.

Since the pinion or pinions mesh with both the inner and outer carrier body, the ratio of their rotational speeds is predetermined in a given case, but this predetermined ratio can be selected at will in the designing of a given machine by suitable choice of the gear ratio provided, through the pinions, between the carrier bodies.

Thus the pinions may be in the form of stepped pinions having a lesser-diameter portion, formed with teeth which mesh with the external teeth of one of the carrier bodies, and a larger diameter portion formed with teeth which mesh with the internal teeth of the other of the carrier bodies, to produce a desired gear ratio (which may be 1:1) between the two carrier bodies.

It has already been mentioned that the rock, unlike gaseous and liquid media, does not constitute a homogenous medium and that therefore as a result of local heterogeneities a slight unbalanced resultant torque has to be supported. For this reason the pinions meshing with the two carrier bodies are supported, for rotation about respective fixed axes, by support means to which the resultant of the torques with which the rock opposes rotation of the inner and outer carrier bodies respectively is transmitted.

Conveniently, this support means comprises a disc flanged on to a central shaft which is arranged in the direction of the road (i.e. Coaxial with the common axis of rotation of the carrier bodies) and so mounted that it transmits both the torque required for maintaining the desired machine course and the axially-directed bearing pressure for the boring tools.

The mounting of the support means may be such that the resultant torque applied to it from the carrier bodies is transmitted through the machine, in conventional manner, to the rock. Alternatively, however, the transmission of the resultant torque through the machine to the rock may be avoided by providing on the central shaft of the mounting means an unbalanced weight or weights which, supported by the shaft, apply thereto a torque, due to gravity, which opposes and balances the resultant torque from the carrier bodies. The torque due to gravity thus applied may be made adjustable, in practice, for example, by providing compensation weights of which the respective distances from the longitudinal axis of the central shaft of the support means are variable corresponding to the varying resultant torque from the carrier bodies which is to be balanced out.

Preferred embodiments of the invention are described below with reference to the accompanying drawing which shows the relevant parts of a boring machine in accordance with the invention merely schematically so that all details which are not necessary for understanding the invention have been omitted, and in which:

FIGURE 1 is an axial sectional view of the rotating head of a rotationally operating boring machine and the adjoining central axis which, in the usual manner and therefore not illustrated, can be mounted on a travelling carriage or the like of the machine; and FIGURE 2 is a fragmentary axial sectional view of part of a second boring machine, generally like that shown in FIGURE 1 but incorporating a modification.

As shown in FIGURE 1, a horizontal underground tunnel, for example a road with a circular cross-section, is advanced in a body of the rock 1 by boring with a boring machine provided with several cutting tools 3 and 4 engaging the rock face which is generally indicated by 5. The cutting tools 3 are mounted on a forward end face of an outer carrier body 6 of the machine, and the cutting tools 4 are mounted on a forward end face of an inner carrier body 7. The individual cutting tools are driven in known manner by individual separate drives 4a or 3a, which can have any desired form and are therefore not illustrated in detail.

The inner and outer carrier bodies 6 and 7 are rotatable about a common axis of rotation, in opposite directions, by means of a drive motor generally indicated by A. This drive motor has a rotor 9 and a stator 10 and, in the embodiment illustrated in FIGURE 1, is an electric motor, for example a three-phase asynchronous motor. However the design of this drive motor A is not of fundamental importance for carrying out the invention.

The rotor 9 of the motor A is rigidly connected with the inner carrier body 7, i.e., is built into the latter. The stator 10 is mounted on a shaft 11 which is guided through a sleeve 12 out of the inner carrier body 7. On its free end the shaft 12 carries a sun wheel 13 and is supported in a channel-bearing 14 of a disc 15, which is secured to a horizontal support shaft 25 comprising the support means of the machine. The sun wheel 13 intermeshes with planet wheels 16 which are mounted by means of shafts 17 so as to be freely rotatable, relative to the disc 15 about axes which are fixed relative thereto.

Each planet wheel 16 intermeshes with a respective pinion 18, the pinions 18 being mounted by means of shafts 19 so that they also are freely rotatable relative to the disc 15 about axes which are fixed relative thereto. Preferably, there are provided three or four planet wheels 16 and the same number of pinions 18. The pinions 18 intermesh with external teeth 20 provided on the inner carrier body 7 and with internal teeth 21 provided on the outer carrier body 6. Between the two carrier bodies mounted one within the other for rotation in opposite directions, are provided roller or ball bearings 22.

As soon as the motor A is energized there is exerted on the rotor 9 a torque which causes it and the inner carrier body 7 to which it is connected to revolve in a given direction of rotation. At the same time an equal and opposite reaction torque is exerted on the stator 11 and on the sun wheel 13 connected thereto, and this reaction torque is transmitted by the planet wheels 16 and the pinions 18 to rotate the outer carrier body 6 in the direction of rotation opposite to that of the inner carrier body 7. Since the pinions 18, as described above, couple the inner carrier body 7 with the outer carrier body 6, the ratio of the speeds of rotation of the two carrier bodies, and also the ratio of the speeds of rotation of the rotor 9 and stator 10, are fixed.

It will be appreciated that the outer carrier body 6 in FIGURE 1 necessarily rotates at greater speed than the carrier body 7; but in the modified arrangement illustrated in FIGURE 2 this is not necessarily the case. In the modification shown in FIGURE 2 the pinions 18 (of which one is illustrated) are stepped pinions having a greater-diameter portion and a lesser-diameter portion. The greater-diameter portion of each pinion 18 is formed with a first set of teeth 23 which mesh with the internal teeth of the carrier body 6 and with the respective planet wheel 16, and the less-diameter portion of each pinion 18 is formed with a second set of teeth which mesh with the external teeth of the inner carrier body 7. This arrangement, it will be understood, provides more flexibility in design of the gear ratio between the two carrier bodies. In particular, it allows a gear ratio of 1:1 to be provided if desired, so that the carrier bodies are constrained to rotate at equal and opposite speeds.

The oppositely-directed torques with which the rock face 5 resists rotation of the outer and inner carrier bodies 6 and 7 respectively are proportional to the respective rotational speeds of the carrier bodies and (apart from any local heterogeneity of the rock) to the rock surface areas acted on by the cutting tools 1 and 3 respectively; and thus by proper choice of the gear ratio between the two carrier bodies, having regard to the relative rock areas acted on by the tools 3 and 4 respectively, it is possible in principle to make these two opposite torques equal so that the net torque exerted by the rock face on the boring head, and transmitted to the disc 15 and shaft 25 of the support means, principally through the shafts 19 of the pinions 18, is zero. Thus neither the support means, comprising the disc 15 and shaft 25, nor the travelling carriage or the like (not shown) on which the shaft 25 is mounted are required, to transmit large amounts of torque to the rock. However, because the rock is not homogeneous the torque resisting rotation of the two carrier bodies will both be variable and in general will not cancel each other out exactly, but will produce a relatively small and variable resultant torque which is transmitted to the disc 15 and must be counteracted. This relatively small resultant torque may be counteracted by transmitting it through the travelling carriage or the like to the rock, in known manner; but alternatively this resultant torque may be counteracted by mounting on the shaft 25 an unbalanced weight or weights (not shown in the drawing) which apply thereto a torque due to gravity which opposes and balances the resultant torque from the carrier bodies. The torque due to gravity may be made variable in practice, for example, by providing respective compensation weights of which the respective distances from the axis of the shaft 25 are variable corresponding to variations in the resultant torque, from the carrier bodies, which is to be balanced out.

The advantages which the invention provides are, first of all, that an almost complete balancing out is obtainable of the two opposite torques which resist rotation of the two carrier bodies, so that only the relatively small resultant torque is transmitted to the support means constituted by the disc 15 and 25. Consequently the travelling carriage or the like on which this support means is mounted can be of relatively light and simple construction, particularly as it does not have to house any drive motors for the two carrier bodies. Particularly in the case where the resultant torque is counteracted by means of compensating weights acting on the shaft 25, the travelling carriage or the like only has the functions of housing machine control means and of advancing the machine along a desired path, undisturbed by torque effects.

Further advantages appear during advancement of the machine, due to the concentric and oppositely rotating arrangement of the two carrier bodies because the spiral paths which the cutters of the boring tools 3 or 4 describe on the rock face 5 are arranged centrally symmetrical to each other. In this way the required magnitude of the forwardly directed feed force can be substantially diminished. Indeed, by suitable design of the cutters, it can be arranged that the boring tools allow themselves to be drawn automatically into the rock face 5.

What is claimed is:

1. A rotationally operating boring machine comprising first and second carrier bodies, each adapted to carry a plurality of cutting tools, concentrically mounted for mutually independent rotation relative about a common axis of rotation, a drive motor comprising a rotor and a stator, the rotor being rigidly connected to the first carrier body for rotation therewith in one direction of rotation and the stator being mounted for rotation about the said common axis, a coaxial shaft for said stator, a support member in which said shaft bears at least one pinion mounted for rotation in said support member, external and internal gear teeth on the respective carrier bodies and meshing with the said pinion, and a planetary drive comprising a sun wheel rigidly connected with the stator shaft for rotation therewith and at least one planet wheel rotatably mounted on said support member and in mesh with the sun wheel and with the said pinion, thereby to drive the second carrier body in the other direction of rotation.

2. A boring machine as claimed in claim wherein said support member comprises a disc, a shaft disposed along the said common axis of rotation and secured to said disc, and each said pinion rotatably mounted in said disc, said shaft being mounted on a body portion of the machine.

3. A boring machine as claimed in claim 1, wherein the said first carrier body having the motor rotor connected thereto, is surrounded by the second carrier body, and wherein the first carrier body is provided with the said external gear teeth and the second carrier body is provided with the said internal gear teeth which mesh with the said opinion.

4. A boring machine as claimed in claim 3, wherein the said pinion is a stepped pinion having a lesser-diameter portion formed with teeth which mesh with the external teeth of the first carrier body and a greater-diameter portion formed with teeth which mesh with the internal teeth of the second carrier body.

References Cited
UNITED STATES PATENTS

| | | | |
|---|---|---|---|
| 1,191,864 | 7/1916 | Wittich | 299—60 |
| 1,888,085 | 11/1932 | Humbel | 299—60 X |
| 2,937,008 | 5/1960 | Whittle | 175—107 X |
| 3,322,466 | 5/1967 | Mennekes | 299—60 |

ERNEST R. PURSER, *Primary Examiner.*